Sept. 9, 1924.  
L. P. TOSADORI  
1,507,696  
APPARATUS FOR PREPARING SKINS FOR STITCHING  
Original Filed June 21, 1923  2 Sheets-Sheet 1
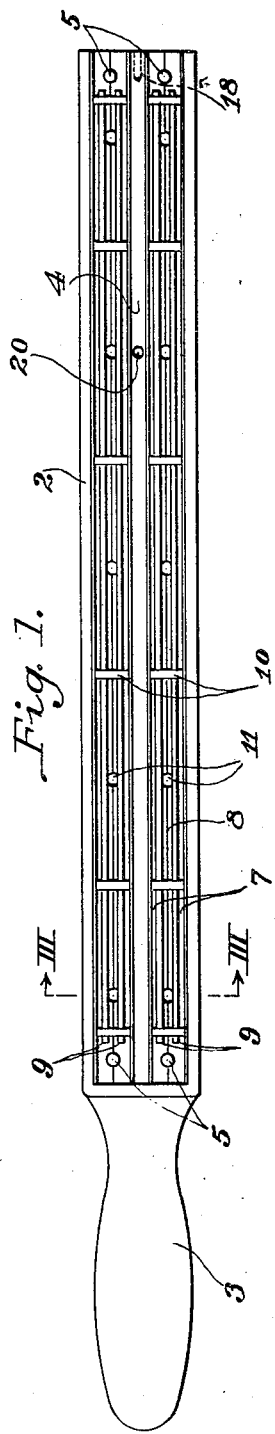
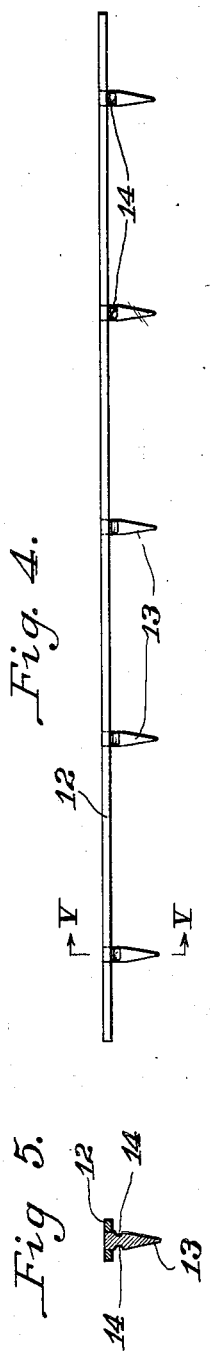
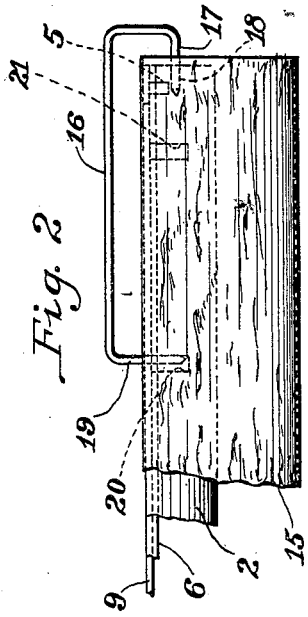
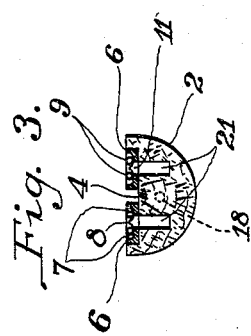
INVENTOR  
Louis P. Tosadori  
By Byrnes, Stebbins & Parmelee  
His Attys Sept. 9, 1924.  
L. P. TOSADORI  
1,507,696  
APPARATUS FOR PREPARING SKINS FOR STITCHING  
Original Filed June 21, 1923  
2 Sheets-Sheet 2
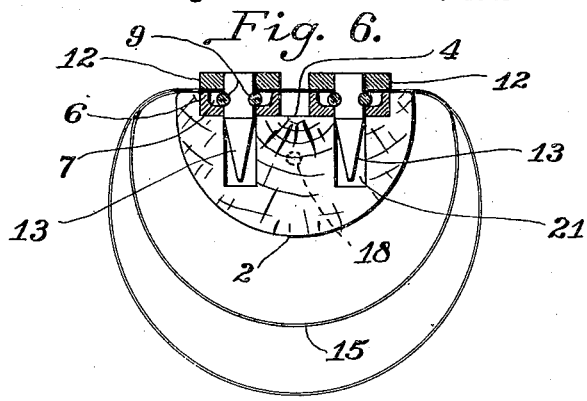
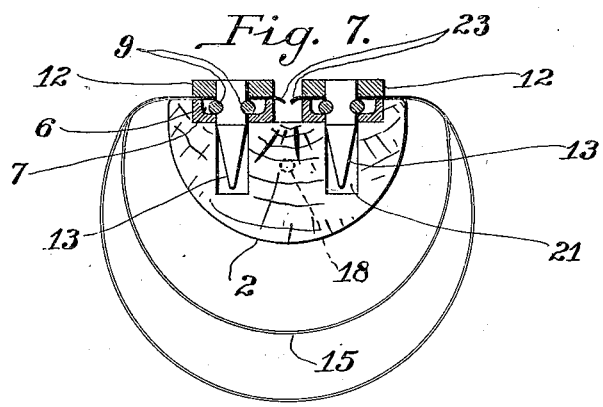
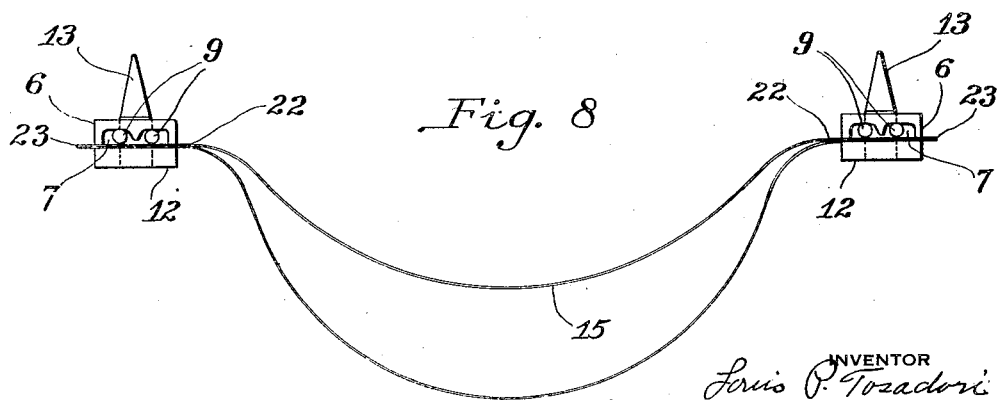

Patented Sept. 9, 1924.

1,507,696

UNITED STATES PATENT OFFICE.

LOUIS P. TOSADORI, OF BEAVER FALLS, PENNSYLVANIA.

APPARATUS FOR PREPARING SKINS FOR STITCHING.

Application filed June 21, 1923, Serial No. 646,800. Renewed July 28, 1924.

*To all whom it may concern:*

Be it known that I, LOUIS P. TOSADORI, a citizen of the United States, residing at Beaver Falls, county of Beaver, and State of Pennsylvania, have invented a new and useful Improvement in Apparatus for Preparing Skins for Stitching, of which the following is a full, clear, and exact description.

The present invention relates to an apparatus for receiving, preparing and holding sections of gut or skins, such as used for the production of sausages of certain kinds, for stitching.

In the production of sausages of certain kinds, it is very desirable to form gut casings which are much larger than can be procured naturally. For this purpose, it is customary to take two or more sections of gut and stitch the same, whereby the diameter of the casing so formed will be substantially equal to the total diameters of the two smallest sections employed.

It is the object of the present invention to provide a portable apparatus adapted to receive and prepare sections of gut of this character for stitching.

In the accompanying drawings, I have shown, for purposes of illustration only, a preferred embodiment of the present invention, in which:

Figure 1 is a top plan view of the gut receiving mandrel having the locking strips in position thereon, Figure 2 is a side elevation, on an enlarged scale, of a portion of the gut receiving end of the mandrel illustrated in Figure 1, Figure 3 is a transverse sectional view on the line III—III of Figure 1, Figure 4 is a side elevation of one of the clamping strips, Figure 5 is a transverse sectional view on the line V—V of Figure 4, Figure 6 is a transverse sectional view through the mandrel illustrating two sections of gut in position thereon, Figure 7 is a view corresponding to Figure 6 illustrating the gut sections as severed, and Figure 8 is a detail view illustrating the gut sections severed and clamped preparatory to stitching.

In accordance with the present invention, there is provided a mandrel 2 which may be formed of any desired material and of any required length, and having a handle 3. The body of the mandrel 2 is preferably substantially semicylindrical in transverse section, and is provided on its upper surface with a channel 4.

Adjacent each end of the channel 4, and on opposite sides of the longitudinal center line thereof, there are provided upwardly projecting pins 5 which are adapted to engage openings in locking strips 6. There is provided a pair of these locking strips, each strip being independent of the other, and both of the strips being of similar construction. Preferably the strips are formed with a pair of side channels 7 separated by an intermediate ridge 8. The channels are of a sufficient depth to receive therein longitudinally extending locking wires 9. At spaced points throughout their lengths, the locking wires, which may be formed of any desired resilient material, are secured to the body of the locking strips by spots of solder 10. Intermediate the points of attachment of the locking wires, the bodies of the locking strips are formed with a plurality of openings 11 having a diameter which is slightly greater than the normal distance between the locking wires.

Adapted to cooperate with the locking strips is a pair of separable clamping strips 12. Each clamping strip has projecting therefrom at intervals corresponding to the distances between the openings 11 perforating and clamping pins 13. These pins are each provided on opposite sides thereof with grooves 14 adapted to receive the locking wires 9 when the clamping strips are forced into position, as indicated in Figures 6 to 8, both inclusive, and thereby firmly holding the clamping strips and locking strips together.

In the use of the apparatus, the locking strips are inserted in position in the channels in a mandrel 2, as indicated in Figure 1. Thereafter, any desired number of gut sections 15 is slipped over the end of the mandrel. After the desired number of gut sections is in position, there is applied a holding clamp 16 having a portion 17 adapted to enter an opening 18 in the end of the mandrel, and a second portion 19 adapted to pass through the portion of the gut sections between the locking strips 6 into engagement with an opening 20 in the body of the mandrel. This clamp holds the skins or gut sections against longitudinal movement on the mandrel, and thereafter they may be stretched and smoothed on the mandrel as required. After the smoothing operation, the gut sections are clamped in position by applying the clamping strips 12, and forcing the pins 13 between the locking wires 9. This spreads the locking wires until such time as the pins 13 have passed through the openings 11 and into the pockets 21 provided therefor in the body of the mandrel. Thereafter, the wires spring into engagement with the grooves 14 and hold the clamping bars in position.

The gut sections at this time occupy substantially the position indicated in Figure 6. They are then severed intermediate the respective strips in any desired manner, as indicated in Figure 7. Thereafter, each locking strip with its cooperating clamping strip is bodily removed from the mandrel and the parts may then be relatively separated, as indicated in Figure 8. At this time, the gut sections may be fed to a stitching machine, which stitches the same along the lines 22 indicated in Figure 8. The respective strips are then separated to release the gut, and the casing is then turned inside out to bring the severed edges 23 on the inside, and provide a smooth exterior.

The advantages of the present invention arise from the provision of an apparatus of this character enabling gut sections to be easily prepared for stitching, and for effectively clamping the severed edges during the stitiching operation, the entire apparatus being portable and composed entirely of relatively separable or movable parts, permitting the same to be easily cleaned and assembled.

I claim:

1. In a gut holding apparatus, a mandrel having a channel therein, upwardly projecting pins in said channel, a pair of separable locking strips removably held in position by said pins, and a pair of separable clamping strips adapted to cooperate with said locking strips, said strips having interengaging clamping means to clamp a plurality of gut sections therebetween for sewing and being bodily removable from the mandrel with the clamped gut sections, each clamping strip and its cooperating locking strip being bodily movable relative to the other clamping strip and its cooperating locking strip to separate the severed edges of the gut sections preparatory to stitching, substantially as described.

2. In a gut holding apparatus, a mandrel having a channel therein, a pair of separable locking strips removably held in position in said channel, each of said locking strips having a plurality of openings formed therein and having locking wires extending longitudinally of the strip and lying on opposite sides of said openings, and a pair of separable clamping strips adapted to cooperate with said locking strips, said clamping strips having pins adapted to extend between said locking wires and through said openings for clamping gut sections in position, each clamping strip and its cooperating locking strip being bodily movable relative to the other clamping strip and its cooperating locking strip to separate the severed edges of the gut section preparatory to stitching, substantially as described.

In testimony whereof I have hereunto set my hand.

LOUIS P. TOSADORI.